Aug. 30, 1949.  V. E. BELANGER ET AL  2,480,279
AIRPLANE CARGO CARRIER
Filed Feb. 19, 1946  2 Sheets-Sheet 1
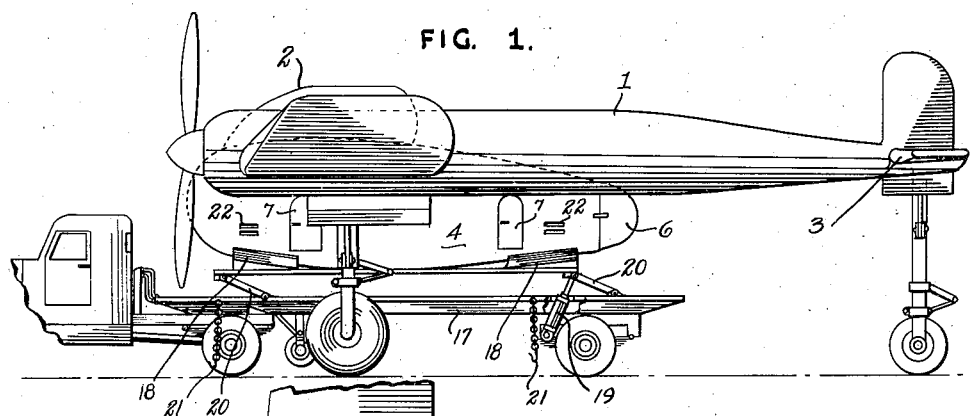
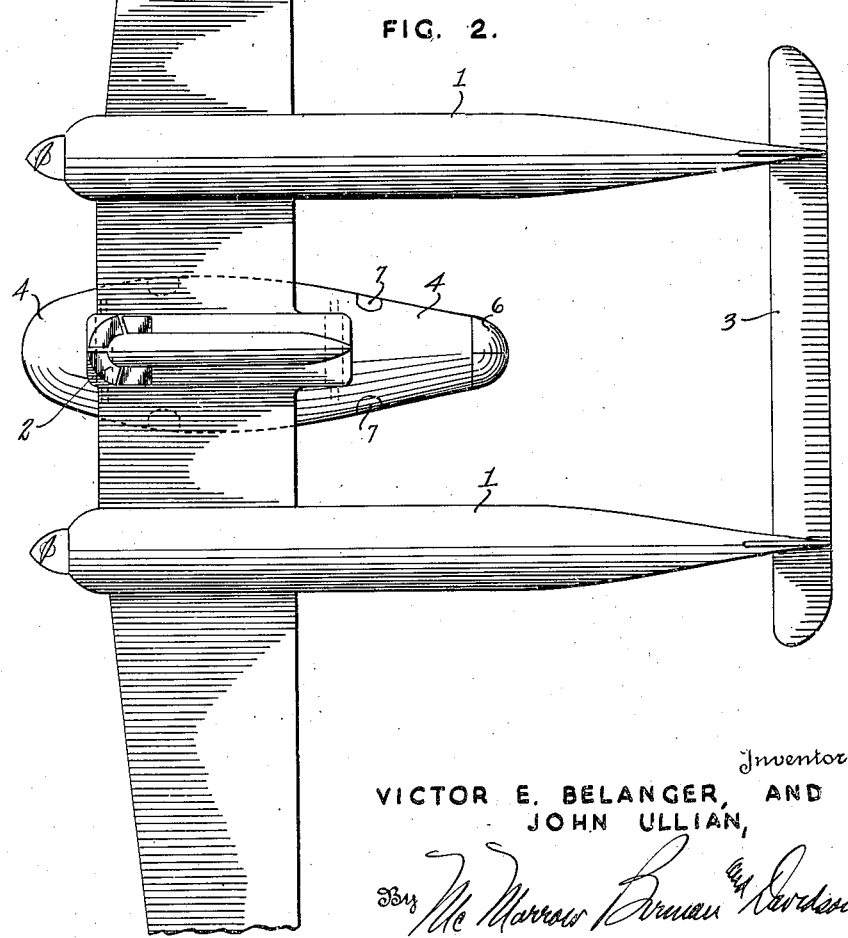
VICTOR E. BELANGER, AND
JOHN ULLIAN,
Inventor

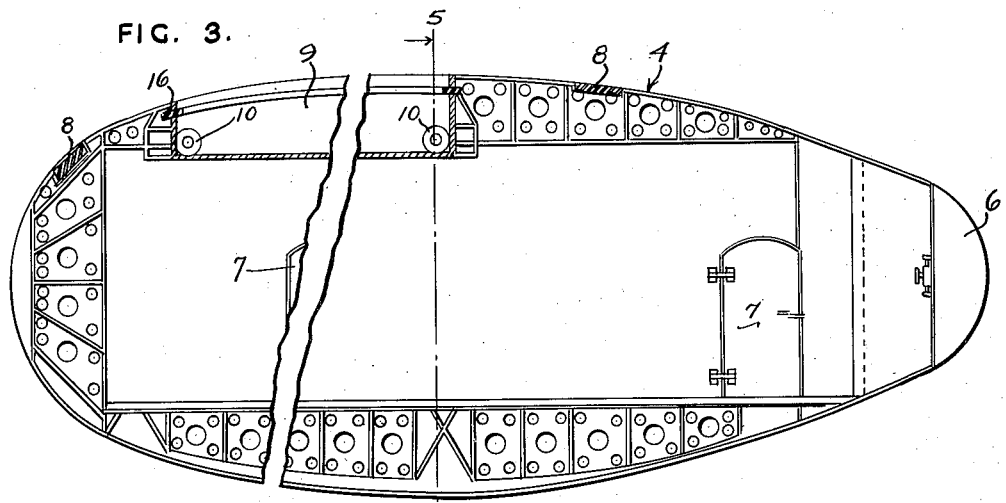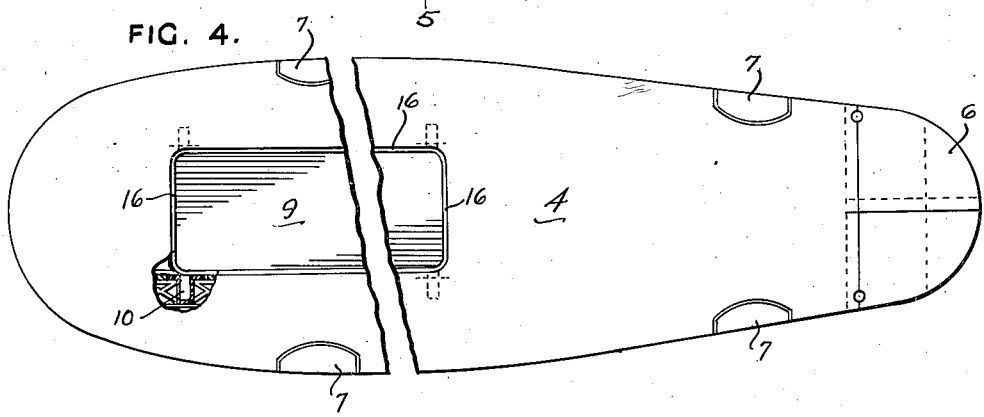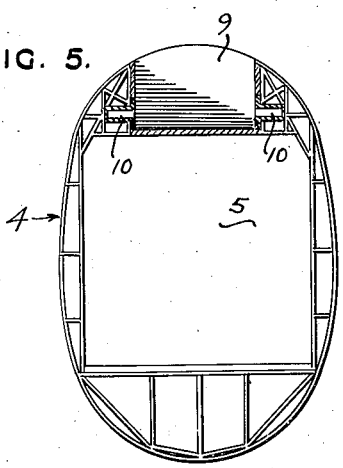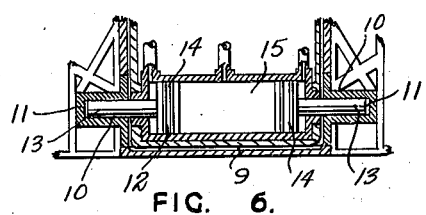
Inventor
VICTOR E. BELANGER, AND
JOHN ULLIAN, Patented Aug. 30, 1949

2,480,279

UNITED STATES PATENT OFFICE 2,480,279

AIRPLANE CARGO CARRIER

Victor E. Belanger, Jamaica Plain, and
John Ullian, Mattapan, Mass.

Application February 19, 1946, Serial No. 648,736

2 Claims. (Cl. 244—118)

This invention relates to improvements in airplanes having detachable cargo carriers.

The primary object of the invention is to provide an airplane having a cargo carrier of the character referred to which can be readily attached and detached and can be lowered onto a truck for the purpose of ground transportation.

Another object of the invention is to provide an airplane cargo carrier which can be securely locked in position to depend beneath an airplane.

A further object of the invention is to provide a unit of the character referred to of simpler and more compact construction than prior devices.

With the foregoing and other objects and advantages in view the invention consists of the novel construction and arrangement of parts hereinafter described and claimed.

In the accompanying drawing illustrating the invention:

Figure 1 is a side elevation.

Figure 2 is a top plan view.

Figure 3 is an enlarged contracted vertical longitudinal section taken through the cargo carrier.

Figure 4 is an enlarged contracted top plan view of the cargo carrier.

Figure 5 is a vertical transverse section taken on line 5—5 of Figure 3.

Figure 6 is a fragmentary detail transverse vertical section of the locking device which is employed to attach the cargo carrier to the under side of the airplane.

Like numerals are used in the description and drawing to designate the same parts of construction.

The type of airplane which is preferably used to carry out this invention, has dual passenger cabins 1 with the cockpit 2 located therebetween and an empennage 3 connecting the rear ends of the cabin fuselages and serving also as a strut. The cargo carrier unit 4 is attached beneath the cockpit. It consists of a casing having a framework of light structural steel or other suitable material properly trussed for strength and providing a reinforced bottom. Exteriorly the body is suitably dimensioned and shaped to be streamlined and interiorly it is provided with a rectangular oblong cargo space or compartment 5. The shape of the compartment may be varied as desired. Folding rear end doors 6 and side doors 7 are provided for loading and unloading purposes. Louvers 8 are suitably placed in the storage unit to provide ventilation for the compartment 5.

On its upper side the cargo carrier is formed with a rectangular well 9 suitably positioned for proper distribution of weight to preserve the airplane's balance. In the side walls of the well adjacent the front and rear thereof and near the bottom of the well are pairs of sockets 10 which are countersunk to be flush with the side walls. These sockets are provided with bolt receiving recesses 11 which are aligned transversely and all of the recesses are positioned in the same horizontal plane.

An integral boss 12, dimensioned to fit said well 9, depends on the under side of the cockpit 2 and is provided on its sides with reciprocatory bolts 13 positioned to engage the sockets 10 in the well 9. These bolts are mounted on pistons 14 and the latter are operated by means of air pressure, hydraulic pressure or boosters connected to the piston cylinder 15. A suitable weather strip 16 is provided for a seal between the well and depending boss 12.

The height of the cockpit from the ground and the greatest vertical dimension of the cargo carrier 4 will be such as to permit a motor truck to be mover under the cargo carrier when the airplane is on the ground, so that the cargo unit can be detached and loaded on the truck. If desired, a larger cargo carrier with a longer cargo compartment may be provided by constructing the body and framework to extend aft to the empennage, where it will be suspended by suitable detachable means and this would be within the inventive concept.

A specially designed truck 17 is employed to raise the cargo carrier into place on the airplane, and to remove it for transportation elsewhere in loaded condition. This truck is provided with one or more elevators, in the form of cradles 18 positioned to fit the underside of the cargo carrier and operated by means of hydraulic or compressed air jacks 19 and cantilevers 20. When the cargo unit is lowered onto the motor truck it is lashed down fore and aft by means of hooks 21 on chains secured to the sides of the truck platform. The hooks are designed to engage keepers 22 on the sides of the cargo carrier. As one loaded cargo unit is removed another truck with another loaded carrier may be backed into position and the cargo carrier thereon quickly raised into place in the airplane.

Having thus described our invention what we claim as new and desire to secure by Letters Patent, is:

1. In an airplane, a fuselage component, a hollow boss depending from said component, a detachable cargo carrier comprising a casing having an upper part conforming substantially to the lower surface of said component, a well formed in said upper part and conformably receiving said boss, spaced sockets formed in the opposite sidewalls of said well, transversely arranged bolts extending in the interior of said boss and laterally extensible beyond the opposite sides of said boss to enter related ones of said sockets to secure said boss in said well, and operating means positioned within the interior of said boss and connected to said bolts for retracting said bolts from said sockets so as to free said boss from said well.

2. In an airplane, a fuselage component, a hollow boss depending from said component, a detachable cargo carrier comprising a casing having an upper part conforming substantially to the lower surface of said component, a well formed in said upper part and conformably receiving said boss, spaced sockets formed in the opposite sidewalls of said well, transversely arranged bolts extending in the interior of said boss and laterally extensible beyond the opposite sides of said boss to enter related ones of said sockets to secure said boss in said well, and operating means positioned within the interior of said boss and connected to said bolts for retracting said bolts from said sockets so as to free said boss from said well, said operating means comprising pistons on said bolts, and pneumatic cylinders in which said pistons are operable in opposite directions.

VICTOR E. BELANGER.
JOHN ULLIAN.

REFERENCES CITED

The following references are of record in the file of this patent:

UNITED STATES PATENTS

| Number | Name | Date |
|---|---|---|
| 1,754,211 | Hardin | Apr. 8, 1930 |
| 1,774,414 | Bleriot | Aug. 26, 1930 |
| 1,797,713 | Brogelli | Mar. 24, 1931 |
| 2,075,042 | Knerr | Mar. 20, 1937 |
| 2,381,400 | Stavely | Aug. 7, 1945 |
| 2,387,527 | Nagamatsu | Oct. 23, 1945 |
| 2,403,754 | Pierson | July 9, 1946 |

FOREIGN PATENTS

| Number | Country | Date |
|---|---|---|
| 575,532 | Great Britain | Mar. 27, 1944 |